No. 625,561. Patented May 23, 1899.
J. G. KEITH.
ROLLER BEARING.
(Application filed July 11, 1898. Renewed Apr. 22, 1899.)
(No Model.) 3 Sheets—Sheet 3.
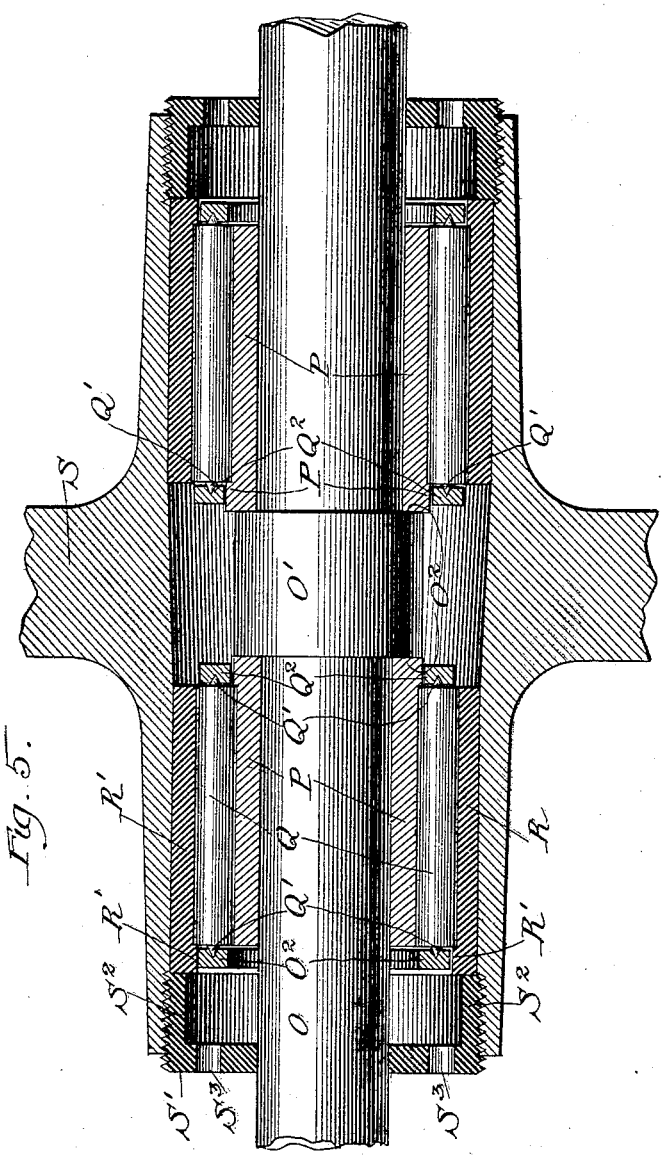

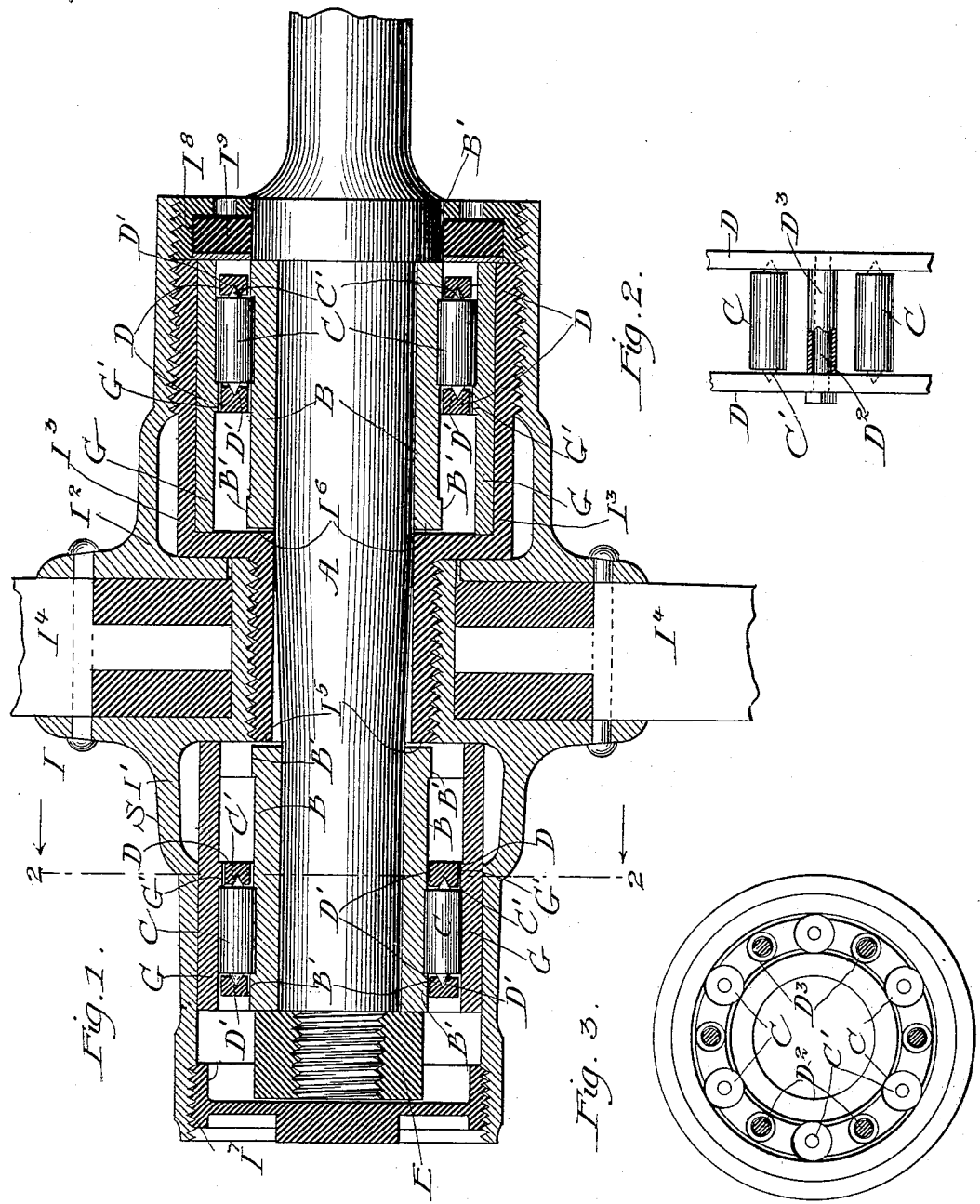

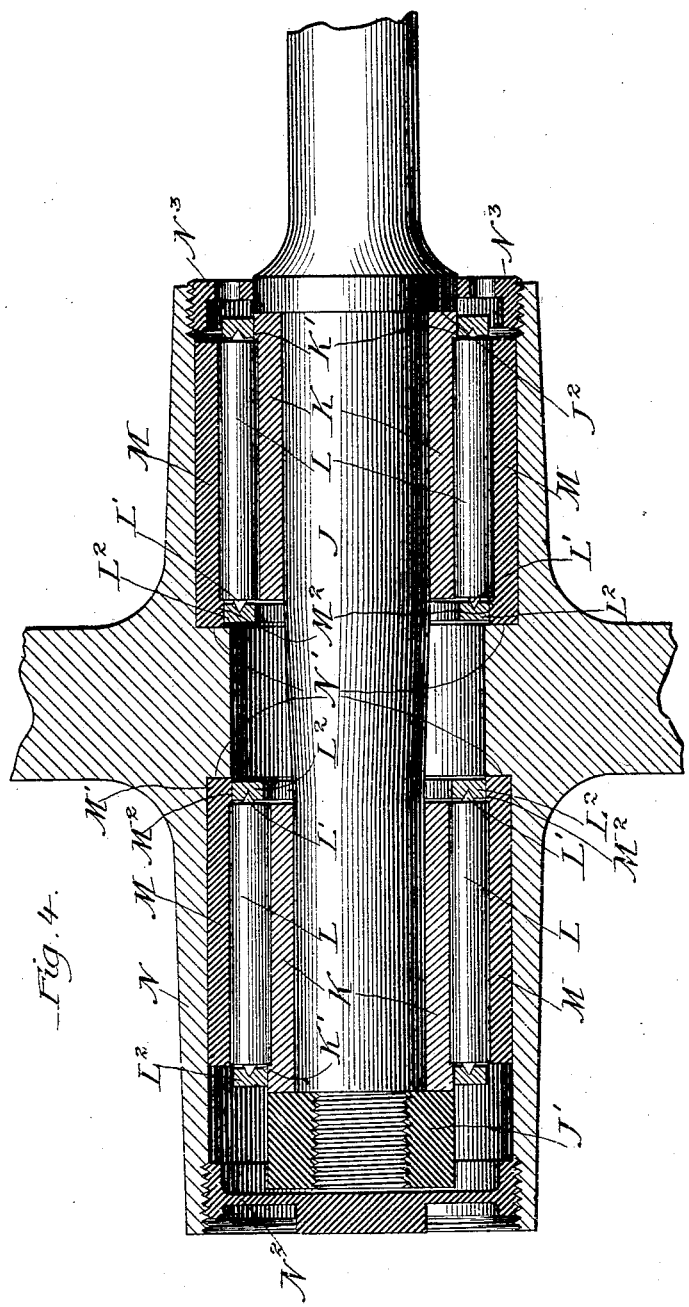

UNITED STATES PATENT OFFICE.

JOHN G. KEITH, OF CHICAGO, ILLINOIS.

ROLLER-BEARING.

SPECIFICATION forming part of Letters Patent No. 625,561, dated May 23, 1899.

Application filed July 11, 1898. Renewed April 22, 1899. Serial No. 714,099. (No model.)

*To all whom it may concern:*

Be it known that I, JOHN G. KEITH, a citizen of the United States, residing at the city of Chicago, in the county of Cook and State of Illinois, have invented certain new and useful Improvements in Roller-Bearings; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates particularly to roller-bearings for wheels to be used in vehicles, but it is also applicable to various kinds of machinery. It is an improvement on the construction described and illustrated in Letters Patent of the United States No. 531,618, granted to me December 25, 1894, and in my pending application, Serial No. 623,870, filed February 17, 1897.

In the accompanying drawings, Figure 1 is a central section parallel to the axis of a hub and axle embodying my improvement. Fig. 2 is a detail of the rollers. Fig. 3 is a section in the line 2 2 of Fig. 1 looking in the direction of the arrows. Figs. 4 and 5 show modifications of the form illustrated by the other figures.

Referring to Figs. 1, 2, and 3 of said drawings, A is an axle or shaft.

B B are cylindric shells or sleeves surrounding the shaft or axle A, preferably so loosely that said shells may rotate upon said shaft if power is applied thereto tending to cause said rotation. The outer surfaces of these sleeves form the ways or tracks for the rollers, and said ways or tracks should be made of hardened metal. For the sake of durability and strength the axle or shaft A should be of relatively soft metal. By the use of these sleeves the latter may be hardened or tempered, as may be desired, to afford proper surface for the rollers, while the shaft A may be tempered for strength and durability. If the said sleeves are made rotatable upon the shaft A, the bearing may remain operative in case the rollers become inoperative through cramping or breaking or other derangement, the action of the bearing then being like that of the ordinary bearings in which rollers are not used.

C C are the rollers. These surround the periphery of the sleeves B in an annular series, around one end of said sleeves the length of such rollers being approximately one-half the length of the sleeve, to the end that one-half of said sleeve may remain in use and unworn until the other end has been worn to such an extent as to require change. The sleeve may then be removed and reversed, so that a new track is provided for the rollers. One end of said sleeve may be made a trifle thicker than the other and said thicker end reserved for second use, so that if the rollers are slightly worn the additional thickness of the shell may compensate for the reduced thickness of the rollers and cause a close fit.

D D are rings loosely surrounding the sleeve B and extending radially partially over the ends of said rollers and having conical cavities $D'$, into which enter conical bearings $C'$ of the rollers C. The rings D are joined to each other by bolts $D^2$, extending transversely through both of said rings. Said bolts may be in any suitable form—as, for example, in the form of screw-bolts passing loosely through one of the rings and being threaded into the other ring. A sleeve $D^3$ may surround each bolt $D^2$ and be of proper length to so separate the rings D as to secure a proper seating of the journals $C'$ in their bearings.

The drawings show upon the periphery of the sleeve B at each end of the latter an annular shoulder $B'$, facing toward the middle of such sleeve and adapted to extend radially partially over the ends of the rollers C, the latter resting against the shoulder $B'$ at the end of the sleeve B then in use. Surrounding the rollers C, rings D D, and sleeve B there is a second sleeve G, which forms the outer track for said rollers. At the middle of the interior of said sleeve G is an annular shoulder $G'$, facing toward the annular shoulder $B'$ on the sleeve B and engaging the ends of the rollers C opposite the ends of said rollers engaged by the shoulder $B'$. It will now be understood that the inner sleeve telescopes into and the outer sleeve telescopes over the outside of said series of rollers. A nut E is threaded upon the outer end of the axle A and bears against the adjacent end of the adjacent sleeve B.

I is a hub composed of the parts $I'$, $I^2$, and $I^3$, threaded into each other and embracing spokes $I^4$, as described in my said Letters Patent, the parts $I'$ and $I^3$ being connected at the middle of the hub, so as to form annular shoulders $I^5$ and $I^6$ around and adjacent to the shaft A. The sleeves G extend by their inner ends to said shoulders $I^5$ and $I^6$. The nut E bearing against the outer end of the outer sleeve B presses the latter toward the middle of the hub and presses the shoulder $B'$ against the end of each adjacent roller C, whereby said rollers are pressed against the shoulders $G'$, and by this means the sleeve G is constantly held toward or against the adjacent shoulder $I^5$ or $I^6$ on the hub, the rings D D being made to clear the nut E and the sleeves B and G, so that said rings are not engaged by the said nut and sleeve. Under this construction the strength of the bearings of the rollers is only required to keep the rollers separated, and the endwise thrust or strain of the bearings is not upon the rings D D nor upon the bearings of the rollers C, but directly upon the body of each roller. This makes not only a simple construction, but a much stronger one than can be had when the endwise strain or thrust is delivered upon the bearings of the rollers.

$I^7$ is a dust-excluding cap threaded into the interior of the hub I at the end adjacent to the nut E.

$I^8$ is a dust-excluding ring surrounding the axle A and screwed into the opposite end of the hub.

$I^9$ is a packing placed within the hub I, between the ring $I^8$ and the ring $I^{10}$, which loosely surrounds the shaft A. Said packing aids in the exclusion of dust.

In Fig. 4 the sleeves forming the tracks for the rollers are of only single length instead of double length, so that they are not adapted to be reversed, and the hub is not sectional, as in Fig. 1. In said figure, J is the axle, $J'$ a nut threaded upon the outer end of said axle, and $J^2$ is an annular shoulder located on the axle at the inner end of the hub. K K are the inner shells or sleeves fitting loosely around the axle J and being each provided with an annular shoulder $K'$, the one adjacent to the nut $J'$ and the other adjacent to the shoulder $J^2$. L L are rollers similar to the rollers C in Fig. 1, and these may be provided with conical journals $L'$ and rings $L^2$, secured to each other by bolts, (not shown in this figure,) as described of the similar parts in Fig. 1. N is the hub. This is provided near the middle of its interior with outwardly-directed transverse shoulders $N'$, extending between the outer edges of the rollers L and far enough from the latter to allow the flange $M'$, forming the shoulder $M^2$, between the rollers and the shoulders $N'$. The shell or sleeve M corresponds to the sleeve G of Fig. 1, forming the outer track of the rollers. When the nut $J'$ is threaded on, it bears against the shell or sleeve K, (said nut merely engaging said sleeve and not the ring $L^2$.) Thus the sleeve K is pressed against the outer ends of the adjacent rollers L, and the latter are pressed against the shoulder $M^2$ of the sleeve M, whereby said sleeve is pressed against the adjacent shoulder $N'$. At the opposite end of the hub the sleeve K bears against the shoulder $J^2$ and the latter against the adjacent rollers L and said rollers against the adjacent shoulder $M^2$, and the adjacent sleeve M bears against the adjacent shoulder $M'$. At this end of the hub, as well as at the other, the shoulders on the sleeves K and M clear the rings $L^2$ and bear directly against the ends of the rollers L, so that the strain of the end thrust is received by the bodies of the rollers and not by their bearings. $N^2$ is a dust-excluding cap similar to $I'$, (shown in Fig. 1,) and $N^3$ is a dust-excluding ring similar to $I^8$. (Shown in Fig. 1.)

Fig. 5 illustrates a modification of the construction shown in Fig. 4. O is a shaft having an annular collar $O'$, forming lateral transverse annular faces $O^2$. The sleeves P and R and rollers Q, provided with bearings $Q'$ in rings $Q^2$, correspond to the sleeves K and M and rollers L, having bearings $L'$ in rings $L^2$ of Fig. 4. S is a hub. This is without the shoulders $N'$. (Shown in Fig. 4.) At each end of said hub an annular nut $S'$ loosely surrounds the shaft P and is threaded into the interior of the hub. Each of said ends may be provided with a flange $S^2$ and with holes $S^3$ to receive a spanner-wrench. Each of said ends bears against the adjacent shell or sleeve R, and each sleeve P bears against the adjacent shoulder $O^2$.

I claim as my invention—

1. In a roller-bearing mechanism adapted to be placed within a hub and around a shaft and secured by a nut, the combination, with an annular series of rollers and rings to which said rollers are journaled and which do not wholly cover the ends of said rollers radially, of a sleeve telescoping into and another sleeve telescoping over the outside of said series of rollers, one of said sleeves having an annular shoulder extending radially partially over the ends of said rollers while the other of said sleeves has a similar shoulder extending partially over the opposite ends of said rollers, substantially as described.

2. In a roller-bearing mechanism adapted to be placed within a hub and around a shaft and secured by a nut, the combination with an annular series of rollers and rings to which said rollers are journaled and which do not wholly cover the ends of said rollers radially, of a sleeve telescoping into and another sleeve telescoping over the outside of said series of rollers, one of said sleeves being approximately twice as long as said rollers, and one of said sleeves having annular shoulders adapted to extend radially partially over the ends of said rollers while the other of said sleeves has similar shoulders adapted to extend partially over the opposite ends of said rollers, substantially as described.

3. The combination with a shaft and hub and nut and an annular shoulder within said hub of an annular series of rollers, rings to which said rollers are journaled and which do not wholly cover the ends of said rollers radially, a sleeve telescoping into said series of rollers and over said shaft, and another sleeve telescoping over the outside of said series of rollers and into said hub, one of said sleeves having an annular shoulder extending radially partially over the ends of said rollers while the other of said sleeves has a similar shoulder extending partially over the opposite ends of said rollers, one of said sleeves bearing endwise against said first-mentioned shoulder within the hub, and said nut bearing endwise against the other sleeve, in a direction opposed to said shoulder within the hub, substantially as described.

In testimony whereof I affix my signature in presence of two witnesses.

JOHN G. KEITH.

Witnesses:
CYRUS KEHR,
JAMES B. WAYMAN.